US012731553B2

(12) United States Patent
Kim et al.

(10) Patent No.: US 12,731,553 B2
(45) Date of Patent: Sep. 8, 2026

(54) DISPLAY DEVICE

(71) Applicant: LG Display Co., Ltd., Seoul (KR)

(72) Inventors: Taegung Kim, Paju-si (KR); Hwakdong Park, Paju-si (KR); Minhoi Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/971,488

(22) Filed: Dec. 6, 2024

(65) Prior Publication Data

US 2025/0279073 A1 Sep. 4, 2025

(30) Foreign Application Priority Data

Feb. 29, 2024 (KR) ........................ 10-2024-0029734

(51) Int. Cl.
*G09G 3/3291* (2016.01)
*G09G 3/32* (2016.01)
*G09G 3/3266* (2016.01)

(52) U.S. Cl.
CPC ............. *G09G 3/3291* (2013.01); *G09G 3/32* (2013.01); *G09G 3/3266* (2013.01); *G09G 2300/0465* (2013.01); *G09G 2310/0267* (2013.01); *G09G 2310/0275* (2013.01); *G09G 2320/0233* (2013.01)

(58) Field of Classification Search
CPC ...... G09G 3/3291; G09G 3/32; G09G 3/3266; G09G 2300/0465; G09G 2310/0267; G09G 2310/0275; G09G 2320/0233
See application file for complete search history.

(56) References Cited

U.S. PATENT DOCUMENTS

| | | | | |
|---|---|---|---|---|
| 12,230,177 B2 * | 2/2025 | Kwon | .................... | G09G 3/006 |
| 2015/0062200 A1 | 3/2015 | Yang et al. | | |
| 2019/0051246 A1 | 2/2019 | Kim et al. | | |
| 2023/0144298 A1 * | 5/2023 | Koo | ..................... | G09G 3/3233<br>345/204 |

FOREIGN PATENT DOCUMENTS

| | | | |
|---|---|---|---|
| JP | 2005532590 | A | 10/2005 |
| JP | 202024413 | A | 2/2020 |
| KR | 20170123400 | A | 11/2017 |
| KR | 20170124148 | A | 11/2017 |
| KR | 20180002092 | A | 1/2018 |
| KR | 20190012053 | A | 2/2019 |
| KR | 20200016042 | A | 2/2020 |
| KR | 20210080041 | A | 6/2021 |

* cited by examiner

*Primary Examiner* — Kenneth B Lee, Jr.
(74) *Attorney, Agent, or Firm* — Seed Intellectual Property Law Group LLP

(57) ABSTRACT

The present disclosure relates to a display device, which includes a display panel including a plurality of pixel arrays, a gate driving circuit configured to supply a gate signal to the pixel array, a data driving circuit configured to supply an image data voltage for displaying a real image and a fake data voltage for displaying a fake image that differs from the real image to a data line connected to the pixel array, and a controller configured to control the gate driving circuit and the data driving circuit so that the display panel outputs the real image and the fake image, wherein the fake image is output to the display panel at a faster rate than the real image.

20 Claims, 8 Drawing Sheets

DISPLAY DEVICE

CROSS REFERENCE TO RELATED APPLICATION

The present application claims priority to Korean Patent Application No. 10-2024-0029734, filed Feb. 29, 2024, the entire contents of which is incorporated herein for all purposes by this reference.

BACKGROUND

Technical Field

The present disclosure relates to a display device.

Description of the Related Art

As the information society develops, various demands for display devices for displaying images are increasing, and various types of display devices such as liquid crystal display (LCD) devices and organic light emitting diode (OLED) display devices are utilized.

The display devices can improve the quality of images by preventing image sticking and increasing response times of the images through fake data insertion in which a different image (fake image) from a real image is inserted between the real images.

In some implementations of the fake data insertion driving, a sub-pixel circuit has a complicated structure and additional components, such as additional gate driving circuits and lines, which causes reduced aperture ratio of a pixel and shortened lifetime of the display device. In addition, when additional components are disposed in a bezel area, the size of the bezel increases.

BRIEF SUMMARY

The present disclosure provides a display device capable of increasing an aperture ratio by implementing the fake data insertion driving using a sub-pixel circuit having a simple structure.

The present disclosure provides a display device capable of minimizing the size of a bezel by avoiding additional gate driving units for the fake data insertion driving.

The present disclosure provides a display device capable of implementing the fake data insertion driving through a simple and efficient configuration even during high speed driving.

The present disclosure provides a display device capable of minimizing a luminance deviation during the fake data insertion driving.

The technical features and improvements of the present disclosure is not limited to those above-described, and other technical features and improvements that are not mentioned will be able to be clearly understood by those skilled in the art from the following description.

A display device according to one embodiment includes a display panel including a plurality of pixel arrays, a gate driving circuit configured to supply a gate signal to the pixel array, a data driving circuit configured to supply an image data voltage for displaying a real image and a fake data voltage for displaying a fake image that differs from the real image to a data line connected to the pixel array, and a controller configured to control the gate driving circuit and the data driving circuit so that the display panel outputs the real image and the fake image, wherein the fake image is output to the display panel at a faster rate than the real image.

A period during which fake image data corresponding to the fake image is written in the pixel array may be shorter than a period during which real image data corresponding to the real image is written in the pixel array.

The pixel array may include a plurality of sub-pixels, and the sub-pixel may include a light emitting element, a driving transistor configured to drive the light emitting element, a scan transistor electrically connected between a first node of the driving transistor and the data line, a sense transistor electrically connected between a second node of the driving transistor and a reference line disposed on the display panel, and a capacitor electrically connected between the first node and the second node of the driving transistor.

The gate signal may be output through one gate line commonly connected to a gate node of the driving transistor and a gate node of the sense transistor.

The controller may control the gate driving circuit to simultaneously output a scan signal for outputting the fake image to k or more gate lines, and k is 2 or more.

The fake data voltage may be simultaneously output to the k pixel arrays.

The controller may increase a rate of a gate clock output to the gate driving circuit when outputting the fake image.

The real image and the fake image may be alternately output to the display panel, and an $(N+1)^{th}$ real image and an $(N+1)^{th}$ fake image are output in the same direction as an $N^{th}$ real image and an $N^{th}$ fake image.

A real image period during which the real image is displayed may decrease from a first pixel array to a last pixel array, and a fake image period during which the fake image is displayed may increase from the first pixel array to the last pixel array.

The display device may further include a video correction unit configured to compensate a luminance deviation between the plurality of pixel arrays based on the real image period and the fake image period.

The real image and the fake image may be alternately output to the display panel, and an $(N+1)^{th}$ real image and an $(N+1)^{th}$ fake image may be output in a direction opposite to an $N^{th}$ real image and an $N^{th}$ fake image.

The $N^{th}$ real image and the $N^{th}$ fake image may be sequentially output from a first pixel array to a last pixel array, and the $(N+1)^{th}$ real image and the $(N+1)^{th}$ fake image may be sequentially output from the last pixel array to the first pixel array.

An $N^{th}$ real image period during which the $N^{th}$ real image is displayed and an $N^{th}$ fake image period during which the $N^{th}$ fake image is displayed may decrease from the first pixel array to the last pixel array, and an $(N+1)^{th}$ real image period during which the $(N+1)^{th}$ real image is displayed and an $(N+1)^{th}$ fake image period during which the $(N+1)^{th}$ fake image is displayed may increase from the first pixel array to the last pixel array.

A rate at which the fake image is displayed in the first pixel array may be the same as a rate at which the fake image is displayed in the last pixel array.

The fake image may be a black image, a low-grayscale image, or a single color image.

The fake data voltage may be a black data voltage, a low-grayscale data voltage, or a single color data voltage.

Sensing on a characteristic value of a driving transistor may be performed after the fake image is completely output to the display panel.

DETAILED DESCRIPTION

Figure 1:
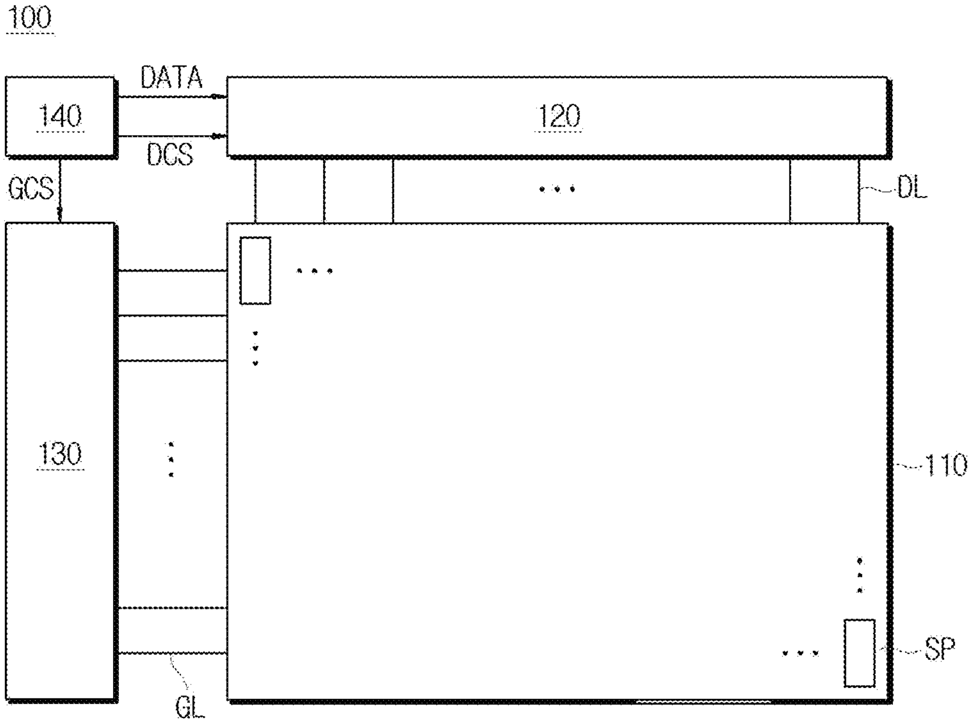
FIG. 1 is a systematic configuration diagram of a display device according to embodiments of the present disclosure.

Hereinafter, some embodiments of the present disclosure will be described in detail with reference to exemplary drawings. In adding reference numerals to components in each drawing, the same components may have the same reference numerals as much as possible even when they are shown in different drawings. In addition, in the description of the present disclosure, when it is determined that a detailed description of a related known configuration or function may obscure the gist of the present specification, detailed description thereof may be omitted. When terms "comprise," "have," "consist of," and the like described in the present specification are used, other parts may be added unless "only" is used. When a component is expressed in the singular, it may include a case where the component is provided as a plurality of components unless specifically stated otherwise.

In addition, in the description of the components of the present disclosure, terms such as first, second, A, B, (a), and (b) may be used. These terms are only for the purpose of distinguishing one component from another component, and the nature, sequence, order, or the like of the corresponding component is not limited by these terms.

In the description of the positional relationship of components, when two or more components are described as being "connected," "coupled," or "joined," it should be understood that the two or more components may be directly "connected," "coupled," or "joined," but two or more components may also be "connected," "coupled," or "joined" with other components "interposed" therebetween. Here, other components may be included in one or more of the two or more components that are "connected," "coupled," or "joined."

In the description of the temporal flow relationship related to components, operation methods, manufacturing methods, and the like, for example, the temporal sequence relationship or the flow sequence relationship, such as "after," "subsequent to," "then," or "before," it may also include a non-continuous case unless "immediately" or "directly" is used.

Meanwhile, in case that numerical values of components or the corresponding information (e.g., a level) are described, even when there is no separate explicit description, the numerical values or the corresponding information can be construed as including a range of error that may occur due to various factors (e.g., process factors, an internal or external impact, and noise).

Hereinafter, various embodiments of the present disclosure will be described in detail with reference to the accompanying drawings.

FIG. 1 is a systematic configuration diagram of a display device according to embodiments of the present disclosure.

Referring to FIG. 1, a display device 100 according to embodiments of the present disclosure may include a display panel 110 and a driving circuit for driving the display panel 110.

From a functional viewpoint, the driving circuit may include a data driving circuit 120, a gate driving circuit 130, etc., and further include a controller 140 for controlling the data driving circuit 120 and the gate driving circuit 130.

The display panel 110 may include a plurality of data lines DL, a plurality of gate lines GL, a plurality of reference lines RL (see FIG. 2), and a plurality of sub-pixels SP.

The display panel 110 may include an active region in which images are displayed and a non-active region in which the images are not displayed. The plurality of sub-pixels SP for displaying the images may be disposed in the active region. In the non-active region, driving circuits 120, 130, and 140 may be electrically connected or mounted, and pad parts may be disposed.

The data driving circuit 120 may drive the plurality of data lines DL by supplying data voltages to the plurality of data lines DL. The data driving circuit 120 may be referred to as a source driving circuit.

The gate driving circuit 130 may drive the plurality of gate lines GL by supplying scan signals and/or sense signals to the plurality of gate lines GL. The gate line GL may serve as a scan signal line through which the scan signal is transmitted and/or a sense signal line through which a sense signal is transmitted.

The controller 140 may supply various driving control signals DCS and GCS to the data driving circuit 120 and the gate driving circuit 130 to control the data driving circuit 120 and the gate driving circuit 130.

The controller 140 may start scanning according to the timing implemented in each frame, convert externally input image data into a data signal format used in the data driving circuit 120, output the converted image data DATA, and control data driving at an appropriate time according to scanning.

The controller 140 receives various timing signals including a vertical synchronization signal VSYNC, a horizontal synchronization signal HSYNC, an input data enable signal DE, a clock signal CLK, etc., together with the input image data from an external device (e.g., a host system).

The controller 140 converts the externally input image data into the data signal format used in the data driving circuit 120 and outputs the converted image data, and additionally, to control the data driving circuit 120 and the gate driving circuit 130, receives the timing signals, such as the vertical synchronization signal VSYNC, the horizontal synchronization signal HSYNC, the input data enable signal DE, and the clock signal CLK, generates various control signals DCS and GCS, and outputs the control signals DCS and GCS to the data driving circuit 120 and the gate driving circuit 130.

For example, the controller 140 outputs various gate control signals including a gate start pulse GSP, a gate clock GCLK, a gate output enable signal GOE, etc., to control the gate driving circuit 130.

Here, the gate start pulse GSP controls operation start timings of one or more gate driver integrated circuits constituting the gate driving circuit 130. In addition, the gate clock GCLK is a clock signal commonly input to the one or more gate driver integrated circuits and controls the shift timing of the scan signal (gate pulse). In addition, the gate output enable signal GOE specifies timing information of the one or more gate driver integrated circuits.

In addition, to control the data driving circuit 120, the controller 140 outputs various data control signals DCS including a source start pulse SSP, a source sampling clock SSC, a source output enable signal SOE, etc.

Here, the source start pulse SSP controls data sampling start timings of one or more source driver integrated circuits constituting the data driving circuit 120. The source sampling clock SSC is a clock signal that controls the sampling timing of data in each of the source driver integrated circuit. The source output enable signal SOE controls the output timing of the data driving circuit 120.

The controller 140 may be implemented as a component separate from the data driving circuit 120 or implemented as an integrated circuit by being integrated with the data driving circuit 120.

The data driving circuit 120 drives the plurality of data lines DL by receiving the image data DATA from the controller 140 and supplying data voltages to the plurality of data lines DL. The data driving circuit 120 is referred to as a source driving circuit.

The data driving circuit 120 may be implemented by including at least one source driver integrated circuit SDIC.

Each of the source driver integrated circuits SDIC may include a shift register, a latch circuit, a digital to analog converter DAC, an output buffer, etc.

Each of the source driver integrated circuits SDIC may further include an analog to digital converter ADC in some cases.

Each of the source driver integrated circuits SDIC may be connected to a bonding pad of the display panel 110 in a tape automated bonding (TAB) type or a chip on glass (COG) type or directly disposed on the display panel, and in some cases, may be disposed by being integrated with the display panel 110. In addition, each of the source driver integrated circuits SDIC may be implemented in a chip on film (COF) type, and in this case, each of the source driver integrated circuits SDIC may be mounted on a circuit film SF connected to the display panel 110 and electrically connected to the display panel 110 through wires on the circuit film SF.

The gate driving circuit 130 may sequentially drive the plurality of gate lines GL by sequentially supplying the scan signals to the plurality of gate lines GL. The gate driving circuit 130 may output a scan signal having a turn-on level voltage or a scan signal having a turn-off level voltage according to the control of the controller 140.

The gate driving circuit 130 may drive the plurality of gate lines GL by supplying the sense signals to the plurality of gate lines GL. The gate driving circuit 130 may output a sense signal having a turn-on level voltage or a sense signal having a turn-off level voltage according to the control of the controller 140.

The scan signal and the sense signal may be gate signals applied to a gate node of a transistor.

The gate driving circuit 130 may be connected to a bonding pad of the display panel 110 in the TAB type or the COG type or directly disposed on the display panel 110 by being implemented in a gate in panel (GIP) type, and in some cases, may be disposed by being integrated with the display panel 110. In addition, the gate driving circuit 130 may be implemented in the form of an integrated circuit (IC) and mounted on a film connected to the display panel 110.

When a specific gate line GL is opened by the gate driving circuit 130, the data driving circuit 120 may convert the image data DATA received from the controller 140 into analog data voltages and supply the analog data voltages to the plurality of data lines DL.

The data driving circuit 120 may be located at only one side (e.g., an upper or lower side) of the display panel 110 and in some cases, may be located at both sides (e.g., the upper and lower sides) of the display panel 110 according to a driving method, a panel design method, etc.

The gate driving circuit 130 may be located at only one side (e.g., a left or right side) of the display panel 110 and in some cases, may be located at both sides (e.g., the left and right sides) of the display panel 110 according to a driving method, a panel design method, etc.

The controller 140 may be a timing controller used in a typical display technology, a control device capable of further performing other control functions other than the timing controller, a control device different from the timing controller, or a circuit in the control device. The controller 140 may be implemented as various circuits or electronic components, such as an integrated circuit (IC), a field programmable gate array (FPGA), an application specific integrated circuit (ASIC), and a processor.

The controller 140 may be mounted on a printed circuit board, a flexible printed circuit, etc., and electrically connected to the data driving circuit 120 and the gate driving circuit 130 through a printed circuit board, a flexible printed circuit, etc.

The controller 140 may transmit and receive signals to and from the data driving circuit 120 according to one or more predetermined interfaces. Here, for example, the interface may include a low voltage differential signaling (LVDS) interface, an EPI interface, a serial peripheral interface (SPI), etc.

The controller 140 may transmit and receive signals to and from the data driving circuit 120 and the gate driving circuit 130 according to one or more predetermined interfaces. Here, for example, the interface may include the LVDS interface, the EPI interface, the SPI, etc. The controller 140 may include a storage such as one or more registers.

The display device 100 according to the present embodiments may be an self-luminous display such as an organic light emitting diode (OLED) display device, a quantum dot display device, a micro light emitting diode (micro LED) display device, etc.

When the display device 100 according to the present embodiments is the OLED display device, each sub-pixel SP may include an OLED that emits light by itself as a light emitting element. When the display device 100 is the quantum dot display device, each sub-pixel SP may include a light emitting element formed of quantum dots that are semiconductor crystals that emit light by themselves. When the display device 100 is the micro LED display device, each sub-pixel SP may include micro LEDs that emit light by themselves and are made of an inorganic material as a light emitting element.

Figure 2:
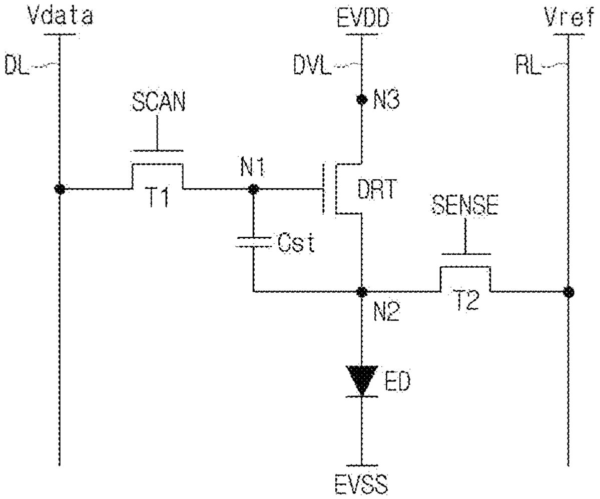
FIG. 2 is a view showing an equivalent circuit of a sub-pixel according to some embodiments of the present disclosure.

FIG. 2 is a view showing an equivalent circuit of a sub-pixel according to some embodiments of the present disclosure.

Each of the plurality of sub-pixels SP may include, for example, a light emitting element ED, a driving transistor DRT, a scan transistor T1, and a storage capacitor (or capacitor) Cst. The sub-pixel structure is referred to as a 2T (transistor) 1C (capacitor) structure.

Referring to FIG. 2, each of the plurality of sub-pixels SP may further include a sense transistor T2 other than the light emitting element ED, the driving transistor DRT, the scan transistor T1, and the storage capacitor Cst. The sub-pixel structure is referred to as a 3T (transistor) 1C (capacitor) structure.

The light emitting element ED may include an anode, a cathode, and a light emitting layer between the anode and the cathode. For example, the light emitting element ED may be the OLED, the LED, the quantum dot light emitting element, etc.

The driving transistor DRT is a transistor for driving the light emitting element ED and may be connected to a first node N1, a second node N2, a third node N3, etc.

The first node N1 of the driving transistor DRT may be a gate node and may be electrically connected to a source node or a drain node of the scan transistor T1.

The second node N2 of the driving transistor DRT may be a source node or a drain node, electrically connected to a source node or drain node of the sense transistor T2, and may also be electrically connected to the first electrode of the light emitting element ED.

The third node N3 of the driving transistor DRT may be electrically connected to a driving voltage line DVL through which a driving voltage EVDD is supplied.

The scan transistor T1 may be turned on or off according to the scan signal SCAN supplied from the gate line GL to control the connection between the data line DL and the first node N1 of the driving transistor DRT.

The scan transistor T1 may be turned on by the scan signal SCAN having a turn-on level voltage to transmit the data voltage Vdata supplied from the data line DL to the first node N1 of the driving transistor DRT.

The sense transistor T2 may be turned on or off according to the sense signal SENSE supplied from the gate line GL to control the connection between a reference line RL and the second node N2 of the driving transistor DRT.

The sense transistor T2 may be turned on by the sense signal SENSE having a turn-on level voltage to transmit a reference voltage Vref supplied from the reference line RL to the second node N2 of the driving transistor DRT.

In addition, the sense transistor T2 may be turned on by the sense signal SENSE having a turn-on level voltage to transmit a voltage at the second node N2 of the driving transistor DRT to the reference line RL.

A function of the sense transistor T2 that transmits the voltage at the second node N2 of the driving transistor DRT to the reference line RL may be used during operation for sensing a characteristic value (e.g., a threshold voltage or mobility) of the driving transistor DRT. In this case, the voltage transmitted to the reference line RL may be a voltage for calculating the characteristic value of the driving transistor DRT.

A function of the sense transistor T2 that transmits the voltage at the second node N2 of the driving transistor DRT to the reference line RL may be used during operation for sensing a characteristic value (e.g., a threshold voltage) of the light emitting element ED. In this case, the voltage transmitted to the reference line RL may be a voltage for calculating the characteristic value of the light emitting element ED.

Meanwhile, the scan signal SCAN and the sense signal SENSE may be the same gate signal. In this case, the scan signal SCAN and the sense signal SENSE may be commonly applied to a gate node of the scan transistor T1 and a gate node of the sense transistor T2 through the same gate line. The sub-pixel structure is referred to as a 1-scan structure.

In some cases, the scan signal SCAN and the sense signal SENSE may be separate gate signals. In this case, the scan signal SCAN and the sense signal SENSE may be applied to the gate node of the scan transistor T1 and the gate node of the sense transistor T2, respectively, through different gate lines. The sub-pixel structure is referred to as a 2-scan structure.

The display device 100 according to the present embodiments has the 1-scan structure. In other words, in the display device 100 according to the present embodiments, the scan signal SCAN and the sense signal SENSE are transmitted to the scan transistor T1 and the sense transistor T2, respectively, through the same one gate line GL commonly connected to the gate node of the scan transistor T1 and the gate node of the sense transistor T2.

The display device 100 according to the present embodiments can reduce the number of gate lines GL by transmitting the scan signal SCAN and the sense signal SENSE through one gate line. Therefore, the display device 100 according to the present embodiments may have a higher aperture ratio than the display device having the 2-scan structure.

Each of the driving transistor DRT, the scan transistor T1, and the sense transistor T2 may be an n-type transistor or a p-type transistor. Hereinafter, for convenience of description, an example in which the driving transistor DRT, the scan transistor T1, and the sense transistor T2 are each the n-type transistor will be described.

The capacitor Cst may be electrically connected between the first node N1 and the second node N2 of the driving transistor DRT. The capacitor Cst is charged with a charge capacity corresponding to a voltage difference of both ends and serves to maintain the voltage difference of both ends for a set frame time. Therefore, the corresponding sub-pixel SP may emit light for the set frame time.

The capacitor Cst may be an external capacitor designed intentionally outside the driving transistor DRT rather than a parasitic capacitor (e.g., Cgs or Cgd) that is an internal capacitor present between the gate node and the source node (or the drain node) of the driving transistor DRT.

Figure 3:
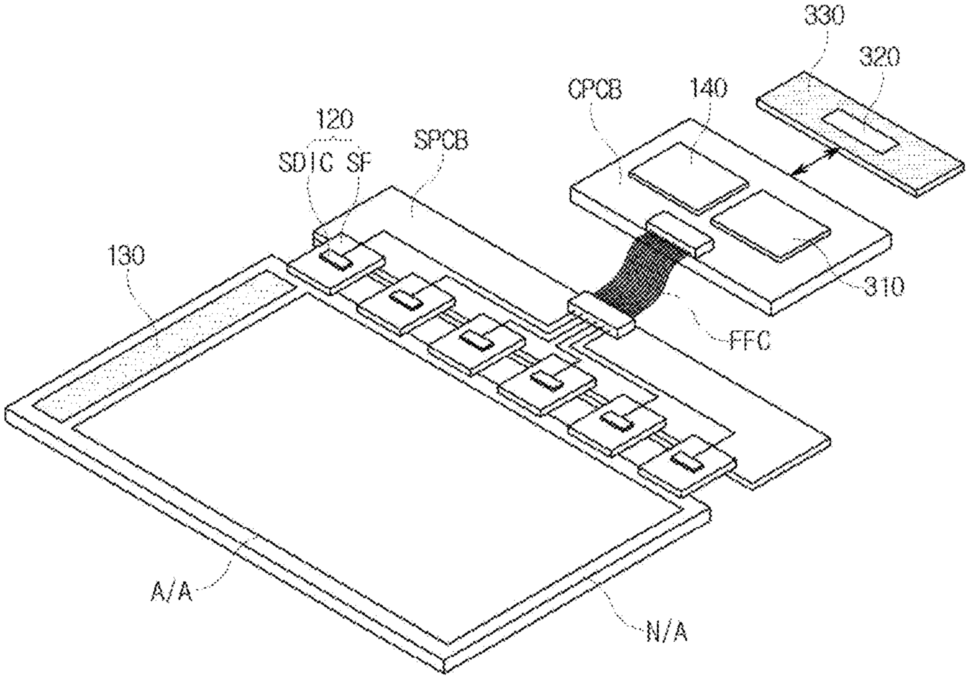
FIG. 3 is an exemplary view showing that the display device according to some embodiments of the present disclosure is systematically implemented.

FIG. 3 is an exemplary view showing that the display device according to some embodiments of the present disclosure is systematically implemented.

Referring to FIG. 3, the display panel 110 may include an active area A/A in which images are displayed and a non-active area N/A in which the images are not displayed.

Referring to FIG. 3, when the data driving circuit 120 is implemented in the COF type, each source driver integrated circuit SDIC included in the data driving circuit 120 may be mounted on the film SF connected to the non-active area N/A of the display panel 110.

Referring to FIG. 3, the gate driving circuit 130 may be implemented in the GIP type. In this case, the gate driving circuit 130 may be formed in the non-active area N/A of the display panel 110. Unlike FIG. 3, the gate driving circuit 130 may be implemented in the COF type.

The display device 100 may include at least one source printed circuit board SPCB for circuit connection between one or more source driver integrated circuits SDIC and other devices, and a control printed circuit board CPCB for mounting control components and various electric devices.

The film SF on which the source driver integrated circuit SDIC is mounted may be connected to the at least one source printed circuit board SPCB. In other words, the film SF on which the source driver integrated circuit SDIC is mounted may have one side electrically connected to the display panel 110 and the other side electrically connected to the source printed circuit board SPCB.

The control printed circuit board CPCB may be provided with a controller 140 for controlling the operations of the data driving circuit 120, the gate driving circuit 130, etc., a power management IC (PMIC) 310 for supplying various voltages or currents to the display panel 110, the data driving circuit 120, the gate driving circuit 130, etc., or controlling various voltages or currents to be supplied, etc.

The at least one source printed circuit board SPCB and the control printed circuit board CPCB may be circuitally connected through at least one connection member. Here, the connection member may be, for example, a flexible printed circuit (FPC), a flexible flat cable (FFC), etc. The at least one source printed circuit board SPCB and the control printed circuit board CPCB may be implemented by being integrated into one printed circuit board.

The display device 100 may further include a set board 330 electrically connected to the control printed circuit board CPCB. The set board 330 may be referred to as a power board. The set board 330 may include a main power management circuit (M-PMC) 320 for managing the overall power of the display device 100.

The PMIC 310 is a circuit for managing the power of the display module including the display panel 110, the driving circuits 120, 130, and 140, etc., and the M-PMC 320 is a circuit for managing the overall power including the display module and may interwork with the PMIC 310.

Meanwhile, the display device 100 may perform a function of inserting a fake image that differs from a real image between the real images and displaying the fake image in one frame period to improve the quality of moving pictures by preventing image sticking and increase a moving picture response time (MPRT). Here, the one frame period may be a period from when any one real image is displayed on the display panel 110 to when the next real image is displayed.

The display device 100 may be driven in a first mode in which only real images are displayed in one frame period or driven in a second mode in which the fake image that differs from the real image is displayed by being inserted between the real images in one frame period. The display device 100 may be configured to switch between the first mode and the second mode or configured to be driven only in the second mode. The first mode may be referred to as a normal mode, and the second mode may be referred to as a crystal motion mode.

Figure 4:
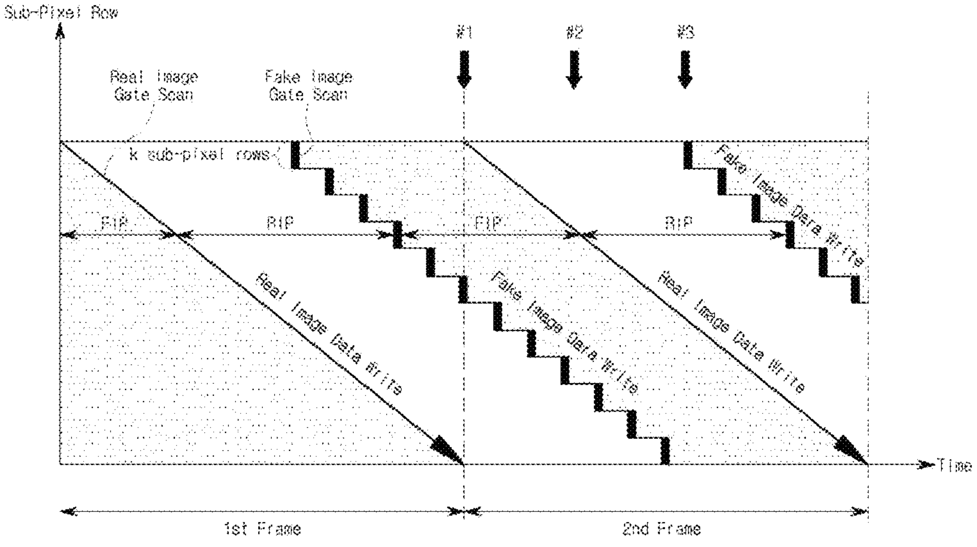
FIG. 4 is a diagram showing fake data insertion driving according to a illustrative example of the present disclosure.
Figure 5:
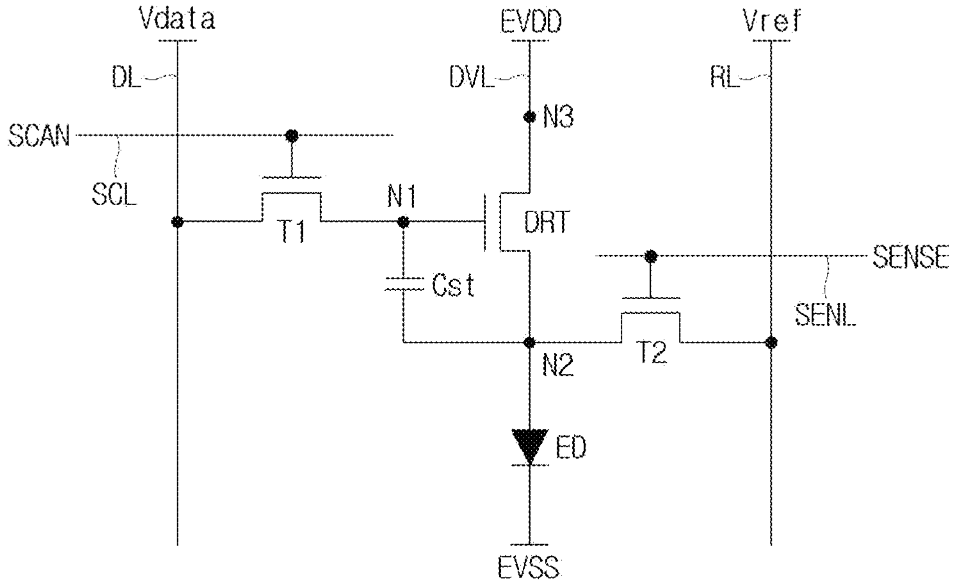
FIG. 5 is a view showing an equivalent circuit of a sub-pixel according to the illustrative example of the present disclosure.

FIG. 4 is a diagram showing fake data insertion driving according to a illustrative example of the present disclosure. FIG. 5 is a view showing an equivalent circuit of a sub-pixel according to the illustrative example of the present disclosure.

Referring to FIGS. 1 and 4, the plurality of sub-pixels SP disposed on the display panel 110 may be arranged in a matrix form. Therefore, the plurality of sub-pixels SP disposed on the display panel 110 form a plurality of sub-pixel rows. The plurality of sub-pixel rows may be scanned sequentially.

In the present specification, “sub-pixel row” may indicate the two-dimensional arrangement of pixels and/or sub-pixels that display images in the display panel. The terms “sub-pixel row” may be referred to as “pixel array,” “sub-pixel array,” “horizontal line,” or “display line.”

Referring to FIGS. 4 and 5, when each sub-pixel SP has the 3T1C structure, a scan signal line SCL through which the scan signal SCAN is transmitted and a sense signal line SENL through which the sense signal SENSE is transmitted may be disposed in each of the plurality of sub-pixel rows. In other words, the illustrative example of the present disclosure may have the 2-scan structure unlike some embodiments of the present disclosure.

A plurality of sub-pixel columns may be present in the display panel 110, and one data line DL may be disposed to correspond to each of the plurality of sub-pixel columns. In some cases, the one data line DL may be disposed every two or three or more sub-pixel columns.

The plurality of sub-pixel rows disposed on the display panel 110 are driven sequentially. As in the above-described driving operation of the sub-pixel, when an $N^{th}$ sub-pixel row among the plurality of sub-pixel rows is driven, the scan signal SCAN and the sense signal SENSE are applied to the sub-pixels SP arranged in the $N^{th}$ sub-pixel row, and the image data voltage Vdata is supplied to the sub-pixels SP arranged in the $N^{th}$ sub-pixel row through the plurality of data lines DL.

Subsequently, an $(N+1)^{th}$ sub-pixel row located under the $N^{th}$ sub-pixel row is driven. The scan signal SCAN and the sense signal SENSE are applied to the sub-pixels SP arranged in the $(N+1)^{th}$ sub-pixel row, and the image data voltage Vdata is supplied to the sub-pixels SP arranged in the $(N+1)^{th}$ sub-pixel row through the plurality of data lines DL.

As described above, image data is written sequentially in the plurality of sub-pixel rows.

The plurality of sub-pixel rows may be sequentially subjected to an image data writing operation, a boosting operation, and a light emitting operation for one frame period according to the above-described driving operation of the sub-pixel.

Referring to FIG. 4, in each of the plurality of sub-pixel rows, “real image period (RIP)” in which “real image” is displayed does not last until the end according to the light emitting operation of the driving operation of the sub-pixel in one frame period. Here, the real image period (RIP) may be referred to as “light emitting period.” In the present specification, “real image” indicates an image that is actually visible to the user. In the present specification, driving for displaying the real image is referred to as “real display driving.”

In the present specification, “fake image” is described as an image that differs from “real image.” In the present specification, “fake image” is an image that is not actually visible to the user, is an image that is displayed between real images or together with the real images in a frame screen, and is an image that may not be perceived by the user because the image is displayed only for a very short time and then disappears.

For example, the fake image according to some embodiments of the present disclosure may be a black image, a low-grayscale image, or a monochromatic image and may be any image as long as it may not be perceived by the user. In the present specification, driving for displaying the fake image is referred to as "fake display driving."

Referring to FIG. 4, each of the plurality of sub-pixel rows may be subjected to the real display driving for a portion (RIP) of one frame period and the fake display driving for the remaining period (FIP).

Referring to FIG. 4, for one frame period, one sub-pixel SP emits light for the real image period (RIP) which corresponds to a portion of one frame period and in which the real images are displayed through the real display driving (the image data writing operation, the boosting operation, and the light emitting operation) and subsequently, does not emit light or displays the fake image that differs from the real image for the remaining period excluding the real image period (RIP) of one frame period through the fake display driving.

The period in which the sub-pixel SP does not emit light or the fake image is displayed for one frame period is referred to as "fake image period (FIP)." Here, the fake image period (FIP) may be referred to as "non-light emitting period."

The fake display driving is a fake driving that differs from the real display driving for displaying the real images and is driving for displaying the fake images between the real images. The fake display driving may be performed in a method of inserting the fake image between the real images.

Therefore, the fake display driving is referred to as "fake data insertion (FDI) driving." Hereinafter, the fake display driving is described as "FDI driving."

During the real display driving, an image data voltage Vdata corresponding to the real image is supplied to the sub-pixels SP to display the real image. In contrast, during the FDI driving, a fake data voltage corresponding to the fake image that is completely unrelated to the real image is supplied to one or more sub-pixels SP.

In other words, during the typical real display driving, the image data voltage Vdata supplied to the sub-pixels SP may be changed depending on frames or images, but during the FIP driving, the fake data voltage supplied to one or more sub-pixels SP may be constant without being changed depending on frames or images.

Hereinafter, a data voltage corresponding to the real image is described as an image data voltage or a real image data voltage, and a data voltage corresponding to the fake image is described as a fake data voltage. For example, the fake data voltage may be a black data voltage, a low-grayscale data voltage, a single color data voltage, etc.

Referring to FIG. 4, during the real display driving, a plurality of sub-pixel rows are scanned one by one and real image data is sequentially written (real image data write). Therefore, a plurality of scan signal lines SCL corresponding one-to-one to the plurality of sub-pixel rows are sequentially scanned one by one (real image gate scan).

Referring to FIG. 4, during the fake display driving (FIP driving), the plurality of sub-pixel rows are sequentially scanned by k at a time (k is a natural number of 2 or more), and fake data is written (fake image data write). In other words, the fake data is simultaneously written in k sub-pixel rows at any one time point. Therefore, the plurality of scan signal lines SCL corresponding one-to-one to the plurality of sub-pixel rows are sequentially scanned by k at a time (fake image gate scan).

Therefore, during the FIP driving at any one time point, the fake data voltage may be simultaneously supplied to k sub-pixel rows. k, which is the number of sub-pixel rows in which the FIP driving is simultaneously performed at any one time point, is a natural number of 2 or more. For example, the number (k) of sub-pixel rows in which the FIP driving is performed at any one time point may be 2, 4, 8, etc.

Referring to FIG. 4, assuming that the fake image is a black image, at a first time point (#1), the fake image may be displayed in an area in which k sub-pixel rows located at an upper end of a screen are located, and the real image may be displayed in the remaining area. At a second time point (#2), the fake image may be displayed in an area in which k sub-pixel rows located in the middle of the screen are located, and the real image may be displayed in the remaining upper and lower areas. At a third time point (#3), the fake image may be displayed in an area in which k sub-pixel rows located at a lower end of the screen are located, and the real image may be displayed in the remaining area.

Referring to FIGS. 4 and 5, components for controlling the light emission of the OLED in the 3T1C structure, such as separate transistors and scan signal lines for blocking a current flowing to the OLED, may be added to implement the fake display driving. However, in this case, there are disadvantages in that the aperture ratio is reduced, the lifetime of the display device 100 is shortened, and the structure becomes complicated. Therefore, it may be considered that the fake display driving is implemented by supplying the fake data voltage as the data voltage Vdata in the 3T1C structure.

In addition, when implementing fake display driving using a two-scan structure as shown in FIG. 5, there is a problem that the aperture ratio is lower than that of a one-scan structure.

Hereinafter, the display device 100 that has a high aperture ratio and may implement the FIP driving with a simple and efficient structure will be described with reference to FIGS. 6 to 12.

Figure 6:
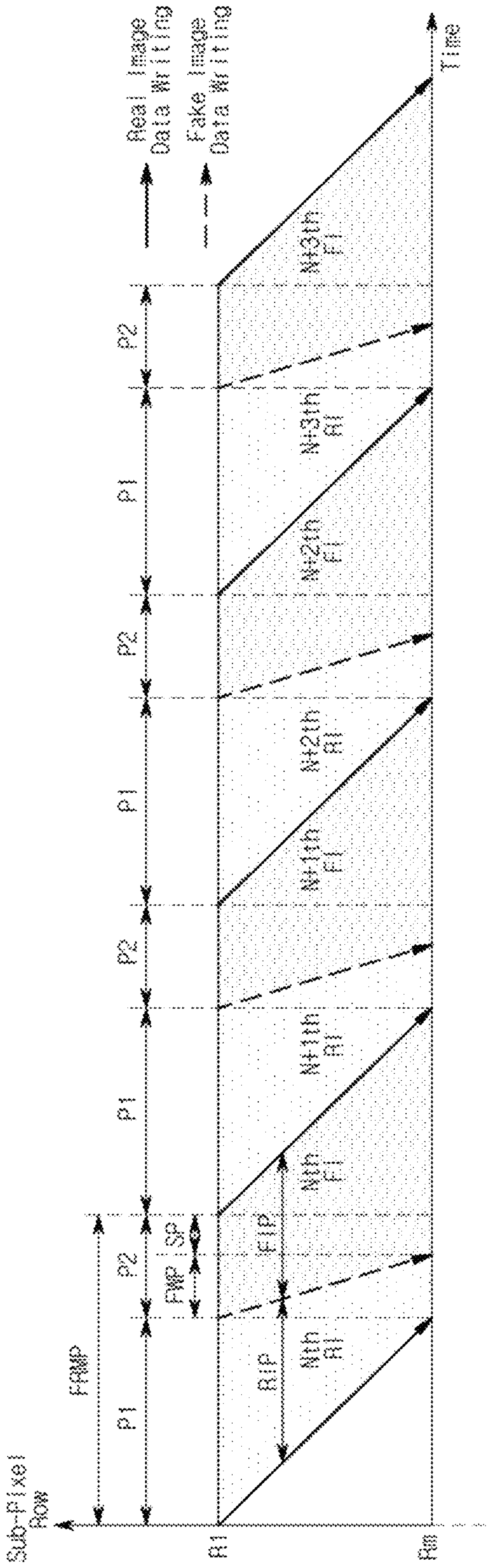
FIG. 6 is a diagram showing fake data insertion driving according to a first embodiment of the present disclosure.

FIG. 6 is a diagram showing fake data insertion driving according to a first embodiment of the present disclosure.

The display device 100 according to some embodiments of the present disclosure may be substantially the same as or similar to the illustrative example of FIGS. 4 and 5 in terms of the 3T1C 1-scan structure, the specific driving method, etc. Hereinafter, a difference between the display devices according to the illustrative example of FIGS. 4 and 5 and some embodiments will be mainly described.

As described above, the display device according to some embodiments of the present disclosure has the 1-scan structure. In each of the plurality of sub-pixel rows, one gate line GL through which the scan signal SCAN and the sense signal SENSE are transmitted may be disposed. One data line DL may be disposed to correspond to each of the plurality of sub-pixel columns. In some cases, the one data line DL may be disposed every two or three or more sub-pixel columns.

Referring to FIG. 6, during the real display driving, the real image data may be sequentially written in the plurality of sub-pixel rows. The real image data writing may be conducted sequentially in a first direction that starts from a first sub-pixel row R1 and ends at a last (or mth) sub-pixel row Rm. The plurality of gate lines GL corresponding one-to-one to the plurality of sub-pixel rows may be scanned sequentially. The real image data can be sequentially written in the plurality of sub-pixel rows one by one.

Thereafter, during the fake display driving, the fake data may be sequentially written in the plurality of sub-pixel rows. The fake data writing may be conducted sequentially in the first direction that starts from the first sub-pixel row R1 and end at the last (or mth) sub-pixel row Rm. In other words, a plurality of real images and a plurality of fake images may be output in the same direction in the display panel 110. The fake data may be sequentially written one by one in the plurality of sub-pixel rows, or sequentially written by two or more at a time therein.

Thereafter, sensing may be performed on at least one of the plurality of sub-pixel rows. The sensing may be real-time sensing of the characteristic value (e.g., a threshold voltage or mobility) of the driving transistor DRT.

The real image data writing may be performed for a first period P1 of one frame period, and the fake data writing and sensing may be performed for a second period P2 of one frame period FRMP excluding the first period P1. The first period P1 may be referred to as "real image data writing period."

The second period P2 may include a fake data writing period FWP and a sensing period SS. The second period P2 may be the sum of the fake data writing period FWP and the sensing period SS. The fake data writing period FWP may be longer than the sensing period SS, but is not limited thereto.

The second period P2 may be shorter than the first period P1. For example, the second period P2 may be in the range of about 30% to 50% of the first period P1. For another example, the second period P2 may be about 40% of the first period P1, but is not limited thereto.

The fake data writing period FWP may be shorter than the first period P1. In other words, the fake data writing may be performed faster than the real image data writing. In other words, a fake image FI may be output to the display panel 110 at a faster rate than a real image RI. Therefore, it is possible to secure a sufficient time for subsequent real image data writing.

In the display device 100 according to some embodiments of the present disclosure, the fake data writing may be performed after the real image data writing for all sub-pixel rows is finished. Therefore, the real display driving and the fake display driving should be controlled according to the driving timing corresponding to a specific frequency, and in particular, when the display device 100 is driven at a high rate at a high frequency, it is important to secure a sufficient time for subsequent real image data writing to match the driving timing.

The display device 100 according to some embodiments of the present disclosure can secure the sufficient time for the subsequent real image data writing even when driven at a high rate by shortening the fake data writing period FWP. Therefore, the next real image data writing timing may be faster.

As the fake data writing period FWP is shorter than the first period P1, the fake image FI may be output at a faster rate than the real image RI.

For example, when the display device 100 is driven at 480 Hz and one frame period FRMP is about 2.08 ms, the first period P1 may be about 1.37 ms, and the second period P2 may be about 0.81 ms. In this case, the fake data writing period FWP may be about 0.54 ms, and the sensing period SS may be about 0.27 ms. However, a specific length of each period is not limited thereto.

Figure 7:
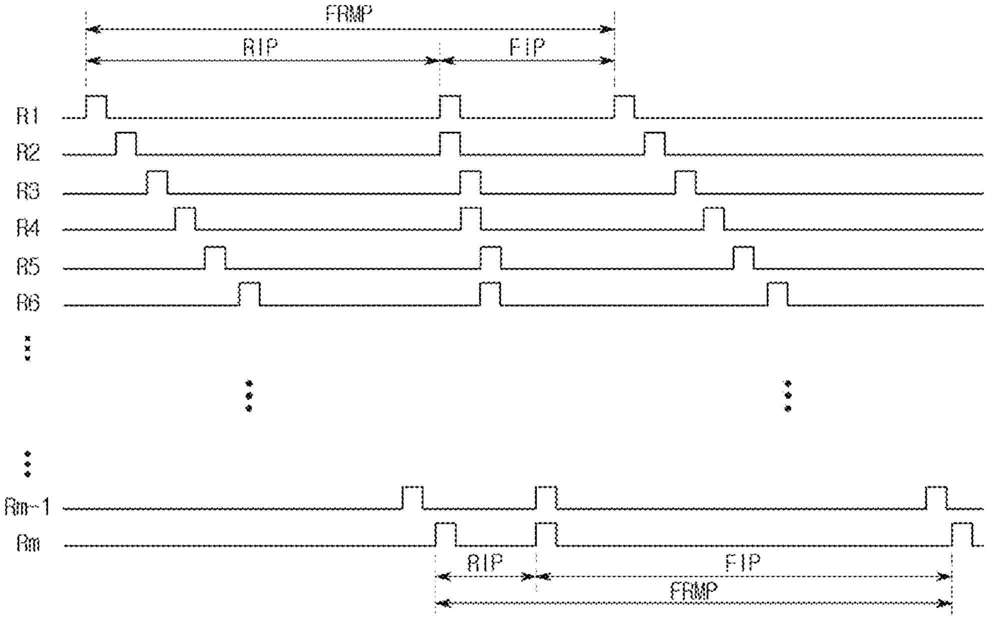
FIG. 7 is a diagram showing a case where fake data writing according to the first embodiment of the present disclosure is performed in two sub-pixel rows at the same time.
Figure 8:
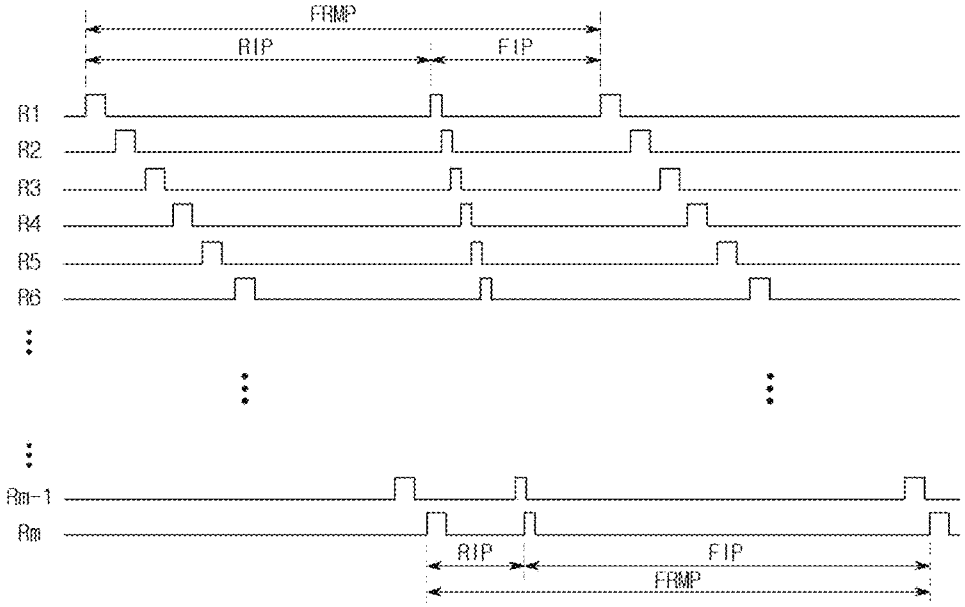
FIG. 8 is a diagram showing a case where the fake data writing according to the first embodiment of the present disclosure is performed at an increased gate clock rate.

FIG. 7 is a diagram showing a case where fake data writing according to the first embodiment of the present disclosure is performed in two sub-pixel rows at the same time. FIG. 8 is a diagram showing a case where the fake data according to the first embodiment of the present disclosure is recorded at an increased gate clock rate.

Referring to FIGS. 6 to 8, the fake data writing period FWP may be shortened by sequentially driving (scanning) a plurality of sub-pixel rows by k at a time and/or changing a rate of the gate clock.

Referring to FIG. 7, for example, the fake data writing period FWP may be shortened by driving the plurality of sub-pixel rows by two at a time. The controller 140 may control the gate driving circuit 130 to sequentially drive the plurality of sub-pixel rows by two at a time. In the case of FIG. 6, a rate of the gate clock for the fake display driving may be the same as a rate of the gate clock for the real display driving, but the present disclosure is not limited thereto.

Referring to FIG. 8, for example, the rate of the gate clock for the fake display driving may be higher than the rate of the gate clock for the real display driving. For example, during the real display driving, a gate clock at a first rate may be input to the gate driving circuit 130, and during the fake display driving, a gate clock at a second rate higher than the first rate may be input to the gate driving circuit 130.

FIGS. 7 and 8 show sequentially driving the plurality of sub-pixel rows by k at a time and changing the rate of the gate clock, respectively, during the fake display driving. However, the present disclosure is not limited thereto, and in some implementations, during the fake display driving, the sequentially driving the plurality of sub-pixel rows by k at a time and the changing the rate of the gate clock may be performed simultaneously.

Referring to FIGS. 6 to 8, each of the plurality of sub-pixel rows may be subjected to the real display driving during the real image period RIP of the one frame period FRMP and subjected to the fake display driving during the fake image period FIP.

As described above, the fake data writing may be performed faster than the real image data writing. Therefore, the real image period RIP and the fake image period FIP may be changed depending on locations of the sub-pixel rows in the display panel 110. In other words, a rate at which the real image RI and the fake image FI are displayed for each sub-pixel row may be changed for a specific period, for example, the one frame period FRMP.

The real image period RIP may decrease from the first sub-pixel row R1 to the last sub-pixel row Rm. The fake image period FIP may increase from the first sub-pixel row R1 to the last sub-pixel row Rm.

The real image period RIP may decrease from one side of the display panel 110 to the other side of the display panel 110. The fake image period FIP may increase from one side of the display panel 110 to the other side of the display panel 110. The first sub-pixel row R1 may be located at one side of the display panel 110, and the last sub-pixel row Rm may be located at the other side of the display panel 110.

For example, the one side and the other side of the display panel 110 may be an upper side and lower side of the display panel 110, respectively, but are not limited thereto. The one side of the display panel 110 may be the lower, left side, or right side of the display panel 110, and the other side of the display panel 110 may be the upper, right, or left side. Hereinafter, a case where the one side and the other side of the display panel 110 are the upper and lower sides of the display panel 110, respectively will be mainly described.

In the first sub-pixel row R1, the real image period RIP and the fake image period FIP may be substantially the same as the first period P1 and the second period P2, respectively.

For example, when the display device 100 is driven at 480 Hz, the real image period RIP and the fake image period FIP in the first sub-pixel row R1 may be in the range of about 1.35 ms and about 0.81 ms, respectively, and the real image period RIP and the fake image period FIP in the last sub-pixel row Rm may be in the range of about 0.54 ms and about 1.64 ms, respectively, but the present disclosure is not limited thereto.

A ratio of the fake image period FIP to the real image period RIP may be changed depending on the locations of the sub-pixel rows in the display panel 110. The ratio of the fake image period FIP to the real image period RIP may increase from the first sub-pixel row R1 to the last sub-pixel row Rm.

For example, the ratio of the fake image period FIP to the real image period RIP in the first sub-pixel row R1 and the last sub-pixel row Rm may be in the range of about 40% and about 74%, respectively, but is not limited thereto.

The sensing of at least one sub-pixel row may be performed within the fake image period FIP. The sensing period SS may indicate a portion during which sensing is performed of the fake image period FIP.

The sensing period SS may proceed after the fake data writing period FWP. In other words, the sensing may be performed after the fake image writing is finished. In other words, the sensing may be performed after the fake image FI is completely output throughout the display panel 110 or the plurality of sub-pixel rows.

At least one sub-pixel row on which real-time sensing is performed may not emit light for the sensing period SS. Therefore, there may be cases where the sub-pixel rows on which the real-time sensing is performed are visible in the output image of the display device. However, when the sensing is performed after the fake image writing is finished, it is possible to prevent a phenomenon in which the sub-pixel row on which the real-time sensing is performed is visible.

The sensing period SS may proceed based on a specific time point, for example, a vertical blank period of the vertical synchronization signal VSYNC input to the controller 140. As described above, the fake image writing may be sequentially performed from the first sub-pixel row R1 to the last sub-pixel row Rm. Therefore, as shown in FIG. 6, an interval between a start point of the fake image period FIP and a start point of the sensing period SS and an interval between an end point of the fake image period FIP and an end point of the sensing period SS may be changed depending on the locations of the sub-pixels in the display panel 110.

Meanwhile, as the fake data writing period FWP increases from the upper side to the lower side of the display panel 110, a luminance deviation may occur between the upper and lower areas of the display panel 110. It is possible to improve the luminance deviation by correcting the image data Vdata.

Figure 9:
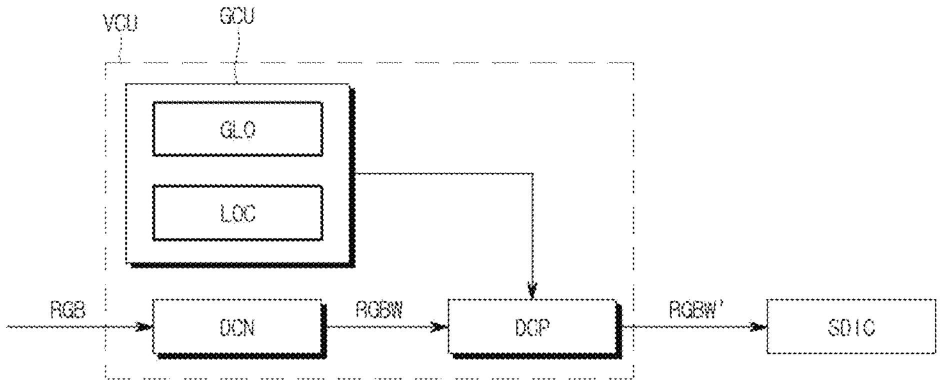
FIG. 9 is a block diagram showing an image correction unit according to the first embodiment of the present disclosure.
Figure 10:
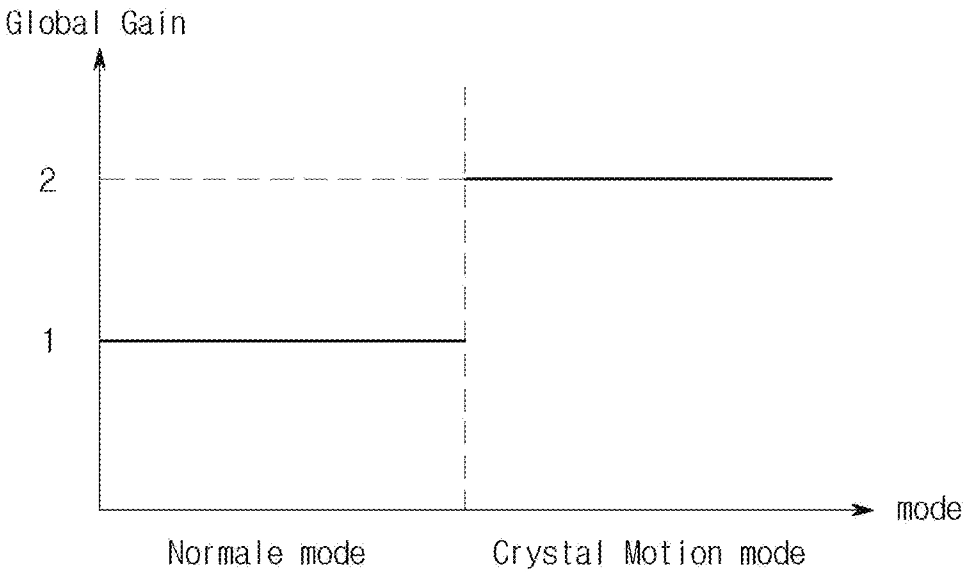
FIG. 10 is a view showing a global gain value according to the first embodiment of the present disclosure.
Figure 11:
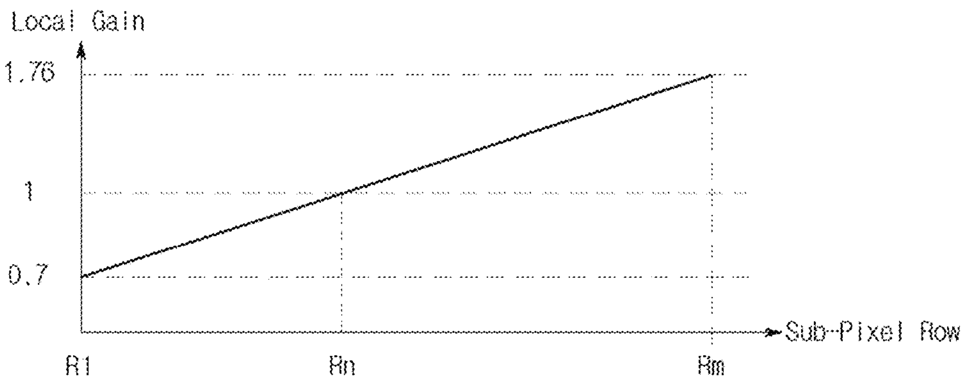
FIG. 11 is a view showing a local gain value according to the first embodiment of the present disclosure.

FIG. 9 is a block diagram showing an image correction unit according to the first embodiment of the present disclosure. FIG. 10 is a view showing a global gain value according to the first embodiment of the present disclosure. FIG. 11 is a view showing a local gain value according to the first embodiment of the present disclosure.

Referring to FIG. 9, the display device 100 may further include a video correction unit VCU. The video correction unit VCU may be embedded in the controller 140. However, the present disclosure is not limited thereto and the video correction unit VCU may be provided as a component separate from the controller 140.

The video correction unit VCU may include a gain calculation unit GCU, a data converter DCN, and a data compensator DCP.

The gain calculation unit GCU may calculate a gain value for adjusting the luminance of the display panel upon switching from the first mode (normal mode) to the second mode (crystal motion mode). The gain value may include a global gain value for adjusting the overall luminance of the display panel 110 and a local gain value for adjusting the luminance difference between the areas in the display panel 110.

The gain calculation unit GCU can calculate the gain value based on frame driving information. The frame driving information may include at least one of the one frame period FRMP, the driving frequency, the real image period RIP, the fake image period FIP, the first period P1, the second period P2, the fake data writing period FWP, and the sensing period SS.

The gain calculation unit GCU may include a global gain operator GLO for calculating a global gain value and a local gain operator LOC for calculating a local gain value.

Referring to FIGS. 9 and 10, the global gain operator GLO may calculate the global gain value for adjusting the overall luminance of the display panel 110 upon switching from the first mode to the second mode. The global gain value may include a first global gain value for the first mode and a second global gain value for the second mode.

The global gain value may be calculated differently according to the mode of the display device 100. The global gain operator GLO may calculate each of the first global gain value and the second global gain value so that the overall luminance of the display panel 110 is the same or similar in the first mode and the second mode.

As described above, while only the real image RI is displayed in the first mode, the real image RI and the fake image FI are displayed in the second mode. For example, the global gain operator GLO may calculate the first global gain value and the second global gain value based on the ratio at which the real image RI and the fake image FI are displayed within the one frame period FRMP in the first mode and the second mode. The ratio at which the real image RI and the fake image FI are displayed may be calculated based on the frame driving information.

The second global gain value may be greater than the first global gain value. For example, as shown in FIG. 10, the first global gain value may be 1 and the second global gain value may be 2, but the present disclosure is not limited thereto.

Referring to FIGS. 9 and 11, when the display device is driven in the second mode, the local gain operator LOC may calculate a plurality of local gain values applied to the plurality of sub-pixels, respectively, to adjust the luminance deviation between the plurality of sub-pixel rows.

The local gain value corresponding to each sub-pixel row may be calculated differently according to the locations of the sub-pixel rows in the display panel 110. The local gain operator LOC may calculate the plurality of local gain values so that the luminance of the upper and lower areas of the display panel 110 is the same or similar.

As described above, the real image period RIP may decrease and the fake image period FIP may increase from the upper side to the lower side of the display panel 110, and thus the luminance of the lower area of the display panel 110 may be lower than that of the upper area thereof. The local gain operator LOC may calculate the plurality of local gain values for allowing the luminance of the display panel 110 to be uniform throughout the entire area of the display panel 110 based on the frame driving information, such as a difference between the real image period RIP and the fake image period FIP between the plurality of sub-pixel rows. In other words, the local gain operator LOC may calculate the plurality of local gain values for allowing the luminance of the plurality of sub-pixel rows to be substantially the same in the second mode.

The plurality of local gain values may gradually increase from the upper side to the lower side of the display panel 110. The plurality of local gain values may gradually increase from the first sub-pixel row R1 to the last sub-pixel row Rm. For example, referring to FIG. 11, the local gain value corresponding to the first sub-pixel row R1 located at the upper side of the display panel 110 may be about 0.7, a local gain value corresponding to an $N^{th}$ sub-pixel row Rn located at a central portion of the display panel 110 may be about 1, and a local gain value corresponding to the last sub-pixel row Rm located at the lower side of the display panel 110 may be 1.76, but the present disclosure is not limited thereto. For example, the $N^{th}$ sub-pixel row Rn may be a sub-pixel row in which the real image period RIP and the fake image period FIP are substantially the same.

The data converter DCN may convert externally input image data RGB into image data RGBW corresponding to colors that the display panel 110 may display. For example, the image data RGB may include red (R), green (G), and blue (B) data, and when the sub-pixel SP is configured to emit light of any one of red (R), green (G), blue (B), and white (W), the data converter DCN may convert the image data RGB into the image data RGBW including the red (R), green (G), blue (B), and white (W) data.

The data compensator DCP may compensate the image data RGBW and output a compensated image data RGBW' to the source driver integrated circuit SDIC.

The data compensator DCP may extend a dynamic range of the converted image data RGBW and limit the luminance by applying the gain value calculated by the global gain operator GLO to the converted image data RGBW. For example, the gain value may be multiplied by the grayscale data of the converted image data RGBW.

When the display device 100 is driven in the first mode, the data compensator DCP may adjust the overall luminance of the display panel 110 in the first mode by applying the first global gain value to the converted image data RGBW. When the display device is driven in the second mode, the global gain operator GLO may adjust the overall luminance of the display panel 110 by applying the second global gain value to the converted image data RGBW.

When the display device 100 is driven in the first mode, the data compensator DCP may not compensate the converted image data RGBW using the local gain value. When the display device 100 is driven in the second mode, the data compensator DCP may apply the plurality of local gain values to the converted image data RGBW so that the luminance of each area in the display panel 110 becomes uniform.

The data compensator DCP may compensate the image data RGBW to remove image sticking in the output image. The data compensator DCP may control average stress for the light emitting elements of the WRGB sub-pixels to remove image sticking in the output image by converting W data of the image data RGBW into RGB data based on an average luminance level of the image data RGBW.

The data compensator DCP may determine a compensation voltage based on a threshold voltage Vth and/or mobility of the driving transistor DRT measured in sensing mode and reflect the compensation voltage in the converted image data RGBW. For example, a compensation voltage Vcomp may be added to grayscale data of the converted image data RGBW.

As described above, the display device 100 may implement the FDI driving using the sub-pixel circuit having the simple structure, thereby having a high aperture ratio and minimizing the size of the bezel. In addition, it is possible to prevent the sub-pixel row on which the real-time sensing is performed from being visible and minimize the luminance difference between the areas in the display panel 110 during the FDI driving.

Figure 12:
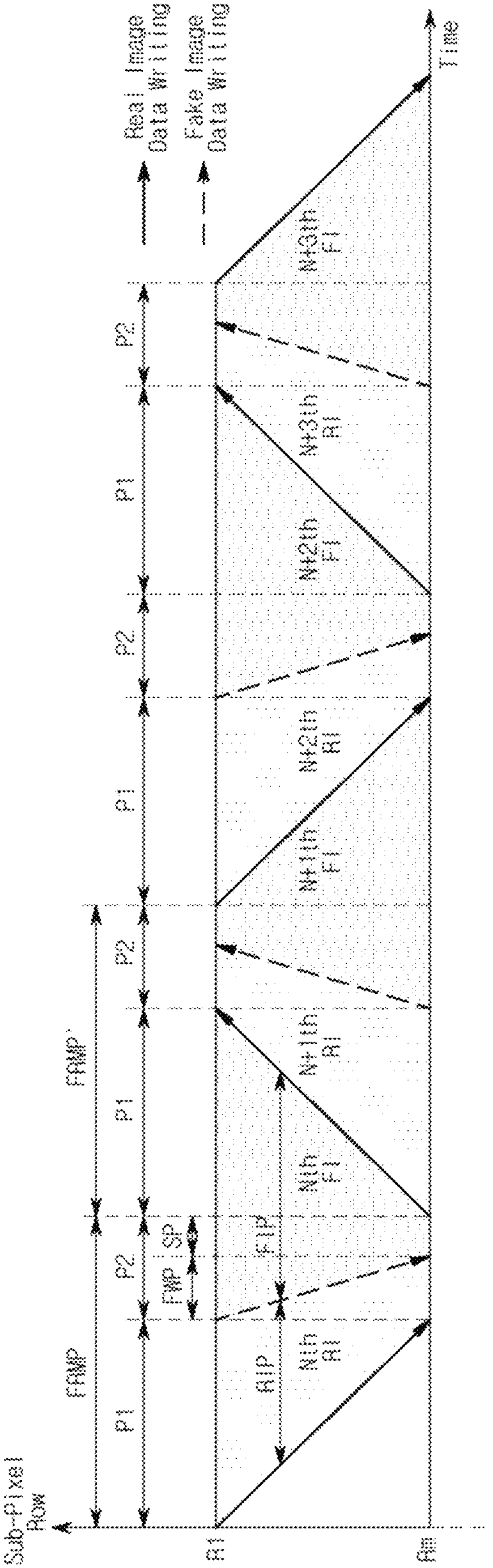
FIG. 12 is a diagram showing fake data insertion driving according to a second embodiment of the present disclosure.

FIG. 12 is a diagram showing fake data insertion driving according to a second embodiment of the present disclosure.

Since some embodiment of FIG. 12 is substantially the same as or similar to some embodiments of FIGS. 6 to 11 except that the real data writing and the fake data writing directions are changed every frame, a difference therebetween will be mainly described below.

Referring to FIG. 12, the display panel 110 may display the real images RI every one frame period FRMP. The fake images FI may be displayed between the real images RI.

The fake data writing may be performed in a method similar to that described in FIGS. 6 to 10. For example, it is possible to shorten the fake data writing time using a method of sequentially driving the plurality of sub-pixel rows by k at a time, a method of increasing the rate of the gate clock, or both methods.

However, a main difference in some embodiment of FIG. 12 is that the directions in which the real image data writing and the fake data writing are performed are changed every one frame period FRMP or FRMP'.

Specifically, an $N^{th}$ real image data writing for outputting an $N^{th}$ real image RI may be performed sequentially from the first sub-pixel row R1 to the last sub-pixel row Rm, and then an $N^{th}$ fake data writing for outputting an $N^{th}$ fake image FI may be performed sequentially from the first sub-pixel row R1 to the last sub-pixel row Rm.

In other words, the $N^{th}$ real image data writing and the $N^{th}$ fake data writing may start from the first sub-pixel row R1 and end at the last sub-pixel row Rm.

Meanwhile, an $(N+1)^{th}$ real image data writing for outputting an $(N+1)^{th}$ real image RI and an $(N+1)^{th}$ fake data writing for outputting an $(N+1)^{th}$ fake image FI may be performed in a direction opposite to the $N^{th}$ real image data writing and the $N^{th}$ fake data writing. In other words, in the display panel 110, the $(N+1)^{th}$ real image RI and the $(N+1)^{th}$ fake image FI may be output in the direction opposite to the $N^{th}$ real image RI and the $N^{th}$ fake image FI.

Specifically, the $(N+1)^{th}$ real image data writing may be performed sequentially from the last sub-pixel row Rm to the first sub-pixel row R1, and then the $(N+1)^{th}$ fake data writing may be performed sequentially from the last sub-pixel row Rm to the first sub-pixel row R1.

In other words, the real image data writing and the fake data writing of the $(N+1)^{th}$ frame may start from the last sub-pixel row Rm and end at the first sub-pixel row R1.

While the directions in which the real image data and the fake data are written are changed whenever the real image RI is displayed, the first period P1, the fake data writing period FWP, the sensing period SS, and the second period P2 may remain the same. In other words, the real image data writing rate (for example, a real video data writing rate) and the fake data writing rate may remain the same.

Therefore, for example, in a sub-pixel row-time diagram as shown in FIG. 12, the areas indicating the $(N+1)^{th}$ real image period RIP and the $(N+1)^{th}$ fake image period FIP may have the same shape as the areas indicating the $N^{th}$ real image period RIP and the $N^{th}$ fake image period FIP turned upside down.

The $N^{th}$ real image period RIP and the $N^{th}$ fake image period FIP may gradually decrease from the first sub-pixel row R1 to the last sub-pixel row Rm. On the other hand, the (N+1) real image period RIP and the $(N+1)^{th}$ fake image period FIP may gradually increase from the first sub-pixel row R1 to the last sub-pixel row Rm.

In each sub-pixel row, the sum of the $N^{th}$ real image period RIP and the $N^{th}$ fake image period FIP may be the same as or different from the one frame period FRMP according to the locations of the sub-pixels in the display panel 110. In each sub-pixel row, the sum of the $N^{th}$ real image period RIP, the $N^{th}$ fake image period FIP, the $(N+1)^{th}$ real image period RIP, and the $(N+1)^{th}$ fake image period FIP may be twice the one frame period FRMP.

The display device 100 may alternately perform a method of performing the real and fake data writing from the first sub-pixel row R1 to the last sub-pixel row Rm and conversely, a method of performing the real and fake data writing from the last sub-pixel row Rm to the first sub-pixel row R1.

In other words, an $(N+2)^{th}$ real image data writing and an $(N+2)^{th}$ fake data writing may be performed in the same method as the $N^{th}$ real image data writing and the $N^{th}$ fake data writing, and an $(N+3)^{th}$ real image data writing and an $(N+3)^{th}$ fake data writing may be performed in the same method as the $(N+1)^{th}$ real image data writing and the $(N+1)^{th}$ fake data writing.

As described above, the directions in which the real image data writing and the fake data writing are performed may be changed every one frame period FRMP and/or real image RI.

Therefore, based on a specific period, such as a 2-frame period FRMP, a ratio at which the real image RI and the fake image FI are displayed at the upper and lower sides of the display panel 110 may be the same. For example, for the 2-frame period FRMP, the ratio at which the real image RI and the fake image FI are displayed in the first sub-pixel row R1 may be the same as the ratio at which the real image RI and the fake image FI are displayed in the last sub-pixel row Rm.

For the specific period (e.g., the 2-frame period), the sum of the real image periods RIP and the sum of the fake image periods FIP in the sub-pixel rows are constant regardless of the locations of the sub-pixel rows in the display panel 110. For example, the sum of the $N^{th}$ real image period RIP and the $(N+1)^{th}$ real image period RIP and the sum of the $N^{th}$ fake image period FIP and the $(N+1)^{th}$ fake image period FIP may be constant regardless of the locations of the sub-pixel rows in the display panel 110.

Therefore, it is possible to prevent the luminance deviation between the upper and lower areas of the display panel 110, thereby minimizing the luminance deviation in the display panel 110. In addition, it is possible to omit the compensation of the luminance deviation between the upper and lower sides by the component for compensating the luminance deviation caused by the FDI, such as the video correction unit VCU described with reference to FIG. 11.

According to the display device according to some embodiments, it is possible to increase the aperture ratio by implementing the fake data insertion driving using the sub-pixel circuit having the simple structure.

According to the display device according to some embodiments, it is possible to minimize the size of the bezel by omitting the additional gate driving units for the fake data insertion driving.

According to the display device according to some embodiments, it is possible to implement the fake data insertion driving through the simple and efficient configuration even during high speed driving.

According to the display device according to some embodiments, it is possible to minimize the luminance deviation during the fake data insertion driving.

The effects of the present disclosure are not limited to the above-described effects, and other effects that are not mentioned will be able to be clearly understood by those skilled in the art from the above detailed description.

The above description and the accompanying drawings are merely illustrative of the technical spirit of the present disclosure, and those skilled in the art to which the present disclosure pertains can perform various changes or modifications, such as coupling, separation, substitution, and change of components, without departing from the essential characteristics of the present disclosure. Therefore, some embodiments disclosed herein are not intended to limit the technical spirit of the present disclosure, but to describe the same, and the scope of the technical spirit of the present disclosure is not limited by these embodiments. The scope of the present disclosure should include those of the appended claims, and all technical spirits within the equivalent range should be construed as being included in the scope of the present disclosure.

DESCRIPTION OF REFERENCE NUMERALS

100: display device
110: display panel
120: gate driving circuit
130: data driving circuit
140: controller The various embodiments described above can be combined to provide further embodiments. Aspects of some embodiments can be modified, if necessary to employ concepts of the various embodiments to provide yet further embodiments.

These and other changes can be made to some embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:

a display panel including a plurality of pixel arrays;

a gate driving circuit configured to supply a gate signal to a pixel array of the plurality of pixel arrays;

a data driving circuit configured to supply an image data voltage for displaying a real image and a fake data voltage for displaying a fake image that differs from the real image to a data line connected to the pixel array; and a controller configured to control the gate driving circuit and the data driving circuit so that the display panel outputs the real image or the fake image, wherein the fake image is configured to be output to the display panel at a faster rate than the real image, and a ratio in time between a first period of displaying the real image and a second period of displaying the fake image varies among different locations of pixel arrays of the plurality of pixel arrays, the second period immediately subsequent to the first period.

2. The display device of claim 1, wherein a period during which fake image data corresponding to the fake image is written in the pixel array is shorter than a period during which real image data corresponding to the real image is written in the pixel array.

3. The display device of claim 1, wherein the pixel array includes a plurality of sub-pixels, and the sub-pixel includes:

a light emitting element;

a driving transistor configured to drive the light emitting element;

a scan transistor electrically connected between a first node of the driving transistor and the data line;

a sense transistor electrically connected between a second node of the driving transistor and a reference line disposed on the display panel; and a capacitor electrically connected between the first node and the second node of the driving transistor.

4. The display device of claim 3, wherein the gate signal is configured to be output through a same gate line connected to a gate node of the driving transistor and a gate node of the sense transistor.

5. The display device of claim 1, wherein when the fake image is output to the display panel, the controller is configured to control the gate driving circuit to output the gate signal to k or more gate lines at a same time, and k is 2 or more.

6. The display device of claim 5, wherein the fake data voltage is configured to be simultaneously output to k pixel arrays.

7. The display device of claim 1, wherein the controller is configured to increase a rate of a gate clock output to the gate driving circuit when outputting the fake image.

8. The display device of claim 1, wherein the real image and the fake image are configured to alternately output to the display panel, and an $(N+1)^{th}$ real image and an $(N+1)^{th}$ fake image are output in a same direction among the plurality of pixel arrays as an $N^{th}$ real image and an $N^{th}$ fake image, respectively, wherein N is a natural number larger than 0.

9. The display device of claim 8, wherein a real image period during which the real image is displayed is configured to decrease from a first pixel array to an mth pixel array of the plurality of pixel arrays, and a fake image period during which the fake image is displayed is configured to increase from the first pixel array to the mth pixel array.

10. The display device of claim 9, further comprising a video correction unit configured to compensate a luminance deviation among the plurality of pixel arrays based on one or more of the real image period or the fake image period.

11. The display device of claim 1, wherein the real image and the fake image are configured to alternately output to the display panel, and an $(N+1)^{th}$ real image and an $(N+1)^{th}$ fake image are output in a direction opposite to those of an $N^{th}$ real image and an $N^{th}$ fake image, respectively, wherein N is a natural number larger than 0.

12. The display device of claim 11, wherein the $N^{th}$ real image and the $N^{th}$ fake image are output in a first direction from a first pixel array to an mth pixel array of the plurality of pixel arrays, and the $(N+1)^{th}$ real image and the $(N+1)^{th}$ fake image are output in a second direction from the mth pixel array to the first pixel array.

13. The display device of claim 11, wherein an $N^{th}$ real image period during which the $N^{th}$ real image is displayed and an $N^{th}$ fake image period during which the $N^{th}$ fake image is displayed are configured to decrease from the first pixel array to the mth pixel array, and an $(N+1)^{th}$ real image period during which the $(N+1)^{th}$ real image is displayed and an $(N+1)^{th}$ fake image period during which the $(N+1)^{th}$ fake image is displayed are configured to increase from the first pixel array to the mth pixel array.

14. The display device of claim 11, wherein a rate at which the fake image is displayed in the first pixel array is same as a rate at which the fake image is displayed in the mth pixel array.

15. The display device of claim 1, wherein the fake image is a black image, a low-grayscale image, or a single color image.

16. The display device of claim 1, wherein the fake data voltage is a black data voltage, a low-grayscale data voltage, or a single color data voltage.

17. The display device of claim 1, wherein the controller is configured to sense a characteristic value of a driving transistor after the fake image is output to the display panel.

18. A display device comprising:

a display panel including a plurality of pixel arrays;

a gate driving circuit configured to supply a gate signal to a pixel array of the plurality of pixel arrays;

a data driving circuit configured to supply an image data voltage for displaying a real image and a fake data voltage for displaying a fake image that differs from the real image to a data line connected to the pixel array; and a controller configured to control the data driving circuit to supply the image data voltage in a first period of a frame or the fake data voltage in a second period of the frame, wherein the second period is different from the first period in length, and wherein a ratio in time between the first period and the second period varies among different locations of pixel arrays of the plurality of pixel arrays.

19. The display device of claim 18, wherein the second period includes a fake data writing period and a sensing period, fake image data corresponding to the fake image is configured to be written into the pixel array in the fake data writing period, and a characteristic of a transistor in the pixel array is configured to be sensed in the sensing period.

20. The display device of claim 18, wherein the data driving circuit supplies the fake data voltage, the controller is configured to control the gate driving circuit to supply the gate signal to two or more gate lines at a same time, and wherein when the data driving circuit supplies the real data voltage, the controller is configured to control the gate driving circuit to supply the gate signal to only one gate line at a time.

* * * * *